(12) United States Patent
Lee

(10) Patent No.: US 11,142,320 B2
(45) Date of Patent: Oct. 12, 2021

(54) CABIN MODULE AND LAYOUT FOR A PASSENGER AIRCRAFT

(71) Applicant: CATHAY PACIFIC AIRWAYS LIMITED, Hong Kong (CN)

(72) Inventor: James Shing Hin Lee, Hong Kong (CN)

(73) Assignee: CATHAY PACIFIC AIRWAYS LIMITED, Hong Kong (CN)

( * ) Notice: Subject to any disclaimer, the term of this patent is extended or adjusted under 35 U.S.C. 154(b) by 337 days.

(21) Appl. No.: 16/313,734

(22) PCT Filed: Jun. 30, 2017

(86) PCT No.: PCT/EP2017/066287
§ 371 (c)(1),
(2) Date: Dec. 27, 2018

(87) PCT Pub. No.: WO2018/002308
PCT Pub. Date: Jan. 4, 2018

(65) Prior Publication Data
US 2019/0225340 A1 Jul. 25, 2019

(30) Foreign Application Priority Data

Jun. 30, 2016 (EP) .................................... 16177293

(51) Int. Cl.
*B64D 11/06* (2006.01)
*B64C 1/10* (2006.01)
*B64D 11/00* (2006.01)

(52) U.S. Cl.
CPC ............ *B64D 11/0604* (2014.12); *B64C 1/10* (2013.01); *B64D 11/0601* (2014.12);
(Continued)

(58) Field of Classification Search
CPC ............ B64D 11/0601; B64D 11/0023; B64D 11/0606; B64D 11/0641; B64D 11/0604;
(Continued)

(56) References Cited

U.S. PATENT DOCUMENTS 1,515,576 A   11/1924  Gentzcke
2,632,408 A * 3/1953  Eugene ............. B64D 11/0641
                                                    105/344
(Continued)

FOREIGN PATENT DOCUMENTS

EP   2 578 788 A1   4/2013
EP   2 708 467 A2   3/2014
(Continued)

OTHER PUBLICATIONS

Notice of Reasons for Rejection issued in Japanese Patent Application No. 2018-567707 dated Mar. 30, 2021, with English translation.

*Primary Examiner* — Christopher D Hutchens
(74) *Attorney, Agent, or Firm* — BakerHostetler

(57) ABSTRACT

A cabin module for a commercial aircraft includes a set of bulkheads defining a quadrant with an inboard wall and converging side walls. The module is sub-divided by a removable partition which splits the module into two passenger compartments. The quadrant shape of the module enables it to overlap an adjacent seat area, thereby using space between seat areas that is otherwise underutilised. In a particular form the modules define a single central aisle which transitions from a pair of parallel aisles aft via a Y-shaped transition region.

2 Claims, 5 Drawing Sheets

(52) U.S. Cl.
CPC .. *B64D 11/0606* (2014.12); *B64D 2011/0046* (2013.01); *B64D 2011/0069* (2013.01)

(58) Field of Classification Search
CPC .... B64D 2011/0046; B64D 2011/0069; B64D 11/06
USPC ...................................................... 244/118.6
See application file for complete search history.

(56) References Cited

U.S. PATENT DOCUMENTS

| | | | | |
|---|---|---|---|---|
| 6,073,883 | A * | 6/2000 | Ohlmann | B64D 11/00 105/316 |
| 6,474,599 | B1 * | 11/2002 | Stomski | B64C 1/1469 244/118.5 |
| 7,185,849 | B2 * | 3/2007 | Ferry | B62D 33/0612 105/316 |
| 7,275,716 | B2 | 10/2007 | Saint-Jalmes | |
| 7,354,018 | B2 * | 4/2008 | Saint-Jaimes | B64D 11/00 105/315 |
| 7,934,679 | B2 * | 5/2011 | Bock | B64D 11/0605 244/118.6 |
| 8,608,108 | B2 * | 12/2013 | Boren | B64D 11/00 244/118.5 |
| 9,428,274 | B2 | 8/2016 | Moje | |
| 9,994,318 | B2 * | 6/2018 | Roese | B64D 11/00 |
| 2005/0001097 | A1 * | 1/2005 | Saint-Jaimes | B64D 11/0023 244/118.6 |
| 2007/0152100 | A1 * | 7/2007 | Saint-Jaimes | B64D 11/0604 244/118.6 |
| 2008/0179457 | A1 * | 7/2008 | Guering | B64D 11/00 244/118.5 |
| 2010/0025530 | A1 | 2/2010 | Ferry et al. | |
| 2013/0105627 | A1 * | 5/2013 | Orson | B64D 11/00 244/118.5 |
| 2014/0123571 | A1 * | 5/2014 | Swain | E06B 9/0638 52/79.1 |
| 2014/0248827 | A1 | 9/2014 | Keleher et al. | |
| 2015/0175266 | A1 * | 6/2015 | Ferry | B64D 11/06 244/118.6 |
| 2016/0257408 | A1 * | 9/2016 | Gill | B64D 11/0606 |
| 2016/0376013 | A1 * | 12/2016 | Gonnsen | B64D 25/00 244/118.5 |

FOREIGN PATENT DOCUMENTS

| | | |
|---|---|---|
| WO | 2005/080196 A1 | 9/2005 |
| WO | 2015/059676 A1 | 4/2015 |

\* cited by examiner

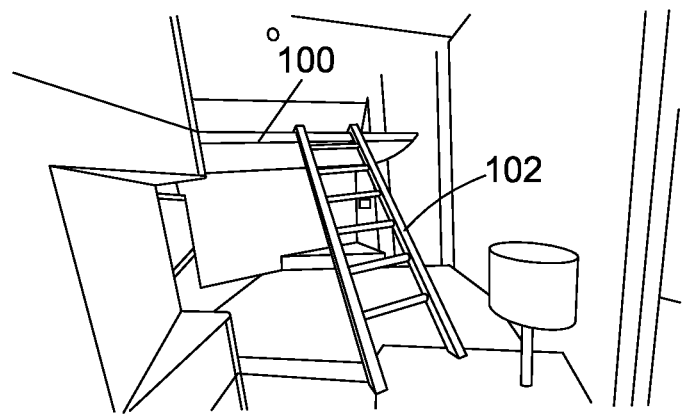
Fig. 7(a)
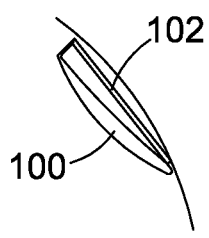 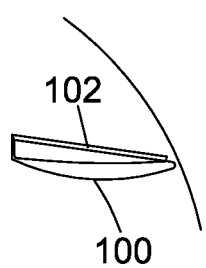 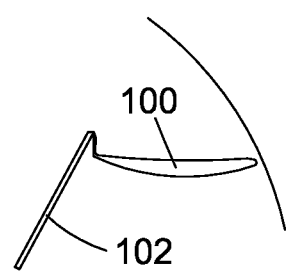
Fig. 7(b)  Fig. 7(c)  Fig. 7(d)

CABIN MODULE AND LAYOUT FOR A PASSENGER AIRCRAFT

CROSS-REFERENCE TO RELATED APPLICATIONS

This application is a National Stage of International patent application PCT/EP2017/066287, filed on Jun. 30, 2017, which claims priority to European Patent Application No. EP 16177293.4, filed on Jun. 30, 2016, the disclosures of which are incorporated by reference in their entirety. This invention relates to passenger accommodation arrangements in the fuselage of a passenger aircraft. The invention is particularly, though not exclusively, relevant to a cabin module and the layout of accommodation in a passenger aircraft.

Various regulatory bodies, for example the Federal Aviation Authority in the USA stipulate criteria for flight safety. For passenger aircraft these include such things as a minimum aisle width in the passenger accommodation area, and a "crew assist space" next to an exit door where airline staff can stand and assist passengers out of an aircraft in an emergency evacuation. The assist space is specified to be a minimum of 20 inches by 12 inches in area next to a minimum 36 inch wide escape path to the door. There is also, a "90 second rule" which stipulates that an aircraft must be capable of being evacuated of all passengers in 90 seconds. All such requirements have to be built into any new layout of aircraft accommodation space.

In long-haul commercial air travel many airlines have installed passenger seats in first and business classes that can be reconfigured as beds. The "lie-flat" experience is very popular with passengers. However, the primary considerations in developing passenger aircraft accommodation after safety are cost and weight. These are often in conflict with creating and implementing a luxury in-flight experience appropriate to first and business classes. As with any aircraft accommodation development, the arrangement of lie-flat beds has to comply with the relevant regulations while at the same time be justifiable in terms of cost and weight. The density of unit seating determines a lot of the cost: the more passengers that can be fitted into a given space, the greater the potential revenue. The density requirement is eased as the grade of accommodation rises. This is offset by the premium prices paid by passengers in premium grade accommodation.

An efficient way of arranging lie-flat seats is the so-called herringbone arrangement shown in FIG. 1. This is the typical twin aisle aircraft cabin with four fore-and-aft first class seats in a front region and twelve business class seats in a herringbone arrangement to aft. The arrangement is compliant with regulations, having the requisite aisle widths and cabin assist spaces, for example. As well as being space efficient the herringbone arrangement also benefits from affording every passenger with direct access to an aisle. No passenger has to step over or round any other passenger when accessing or leaving their seat.

Another efficient use of space for lie-flat seating for business class is the staggered seating layout in FIG. 2. This affords similar levels of space and privacy as the herringbone.

The above focus on the issues of implementing lie-flat beds in an open cabin space for both classes of travel. Each seat has its own space in an open region. There are certain further considerations to be taken into account in first class where the user experience has to be further enhanced in terms of space, privacy and generally a sense of being looked after very well. The typical arrangements in FIGS. 1 and 2, as far as first class is concerned, pose other additional problems. The two-aisle approach necessarily means that there is an inherent inequality of product offering. The two inboard seats are not adjacent windows. Having paid a premium rate for a first class air ticket it risks being a disappointment for an inboard passenger not to have a view out of a window. In addition, the inboard seats are side by side. A first class passenger expects an enhanced sense of privacy which the adjacency of the seats in the open cabin does not naturally provide.

Another issue with the two aisle arrangement in a typical long-haul aircraft such as the Boeing 777 or Airbus A350, is that the seat width is restricted to a maximum of about 40 inches. Increasingly, first class passengers are expecting extra wide seats so that they can invite a fellow passenger to sit with them during the flight. Given the constraints there is no opportunity to increase the seat width for this because the double aisle arrangement takes up a considerable amount of space.

Another issue with the two aisle first class cabin is that the pair of seats arranged on the starboard side often have to be accessed via a galley area located immediately aft of the cockpit. The standard commercial passenger aircraft has a forward passenger door on the port side that is customarily used for passenger embarking and disembarking. The passenger thus has no choice but to walk through the galley area to get to these starboard seats. This represents a "discontinuity" of premium passenger experience—passing through a working area to reach the first class seats on the starboard side.

The solution is to replace the two aisle arrangement with a single central aisle for first class seating. An example of this is shown in FIG. 3. An aisle compliant with the relevant regulations has to be a minimum of 20 inches wide. Having a single aisle reduces the overall aisle width, so allowing for the width of the seats to be increased by 5 inches for each seat. It also largely avoids passengers having to pass through the galley area to get to the seats as the galley can be bypassed. It also means that no seat is disadvantaged by being inboard of an aisle—every seat is adjacent a window. This, however, brings with it its own problems. It is not possible to justify a single aisle arrangement in business class. Without exception, the different classes of cabin on a commercial passenger aircraft are well defined by at least a lateral partition. Given the combination of two aisles in business class and a single central aisle in first class, there is a discontinuity of the path of the aisles at the interface resulting in a sharp dog-leg turn from each of the twin aisles to the single central aisle. For efficient evacuation purposes this means that the transverse aisle section leading from each of the twin aisles to the central aisle has to be wide enough to avoid the risk of a bottleneck in an emergency. This means that the business class seats have to be removed further aft which uses up space without generating revenue.

The typical first class air passenger is a solo traveler. They pay the premium for privacy. However, there is no opportunity in a typical first class cabin to cater for travelling companions to associate during the flight other than by one passenger inviting another passenger into his or her seating space as a guest. For ultimate privacy enclosed cubicles for each passenger have been proposed. Again, the only option for travelling companions to be able to work or socialize together is for one to invite the other as a guest.

Another issue is at the interface between classes of accommodation. The open arrangement of seats in business class is efficient. However, the forward seats create a void area by the side of each one. This is denoted by "S" in FIGS. 1-3. Up to now this is only used for storage for ancillary items such as water bottles, newspapers and the like. Essentially, this is wasted space from a commercial point of view.

The disclosed embodiments herein are aimed at addressing one or more of the above drawbacks associated with prior art seating arrangements with commercial passenger aircraft.

The disclosed embodiments are later defined in the accompanying independent claims. Some preferred features are recited in the claims dependent on each of the independent claims.

An accommodation module for a commercial passenger aircraft may comprise two cabin areas that can be configured as a single suite by removing or retracting a movable member so that the space from the floor between the former separated cabins is made essentially contiguous. In this way the aircraft operator has the option to provide the two private cabins or a single suite by moving the movable member. This is against the commonly accepted understanding in the art that the cabin environment itself is not reconfigurable but the seating is, at best being available to enable a seat to be reconfigured as a bed or so that a passenger can invite another traveler as a guest.

According to disclosed embodiments the cabin module as a whole is reconfigurable to create either separate passenger areas of a full suite of adjacent passenger areas.

Preferably, the seats are arranged away from the removable member so that the floor area enabling the two cabins to function as a suite is open to allow circulation between the cabins.

Preferably, fixed first and second bulkheads define a contiguous (preferably curved) surface. For example, the fixed first and second bulkheads together define a quadrant having radially extending bulkhead portions at each end and a central common bulkhead with a removable portion, whereby seats may be arranged adjacent the radially extending bulkhead portions.

As an arrangement in an aircraft a pair of such modules can define a single central aisle. The central aisle allows both sets of cabins to be adjacent windows of the aircraft. When the arrangement is close to a passenger door the cabins of the modules can be accessed directly from the door via the central aisle.

The modules preferably extend into an adjacent region of seating such that seats adjacent the modules longitudinally overlap with the module and extend into otherwise void spaces to the side of the modules. The consistent approach to the demarcation of classes of travel on an aircraft is to create a well defined space for each class. By arranging the premium grade service within modules, the overlap between them and open second tier seats in a communal open area does not undermine the premium grade experience. To enhance the sense of privacy the modules comprise bulkheads that extend from floor substantially to ceiling and effectively enclose the module space. Regulatory requirements may stipulate a small gap between the internal profile of the fuselage of the aircraft (which comprises the floor) and the bulkheads of the module to enable passage of air during a rapid cabin decompression at altitude.

The disclosed embodiments also include modules of one type of seating defined by bulkheads and seat units of a second type of seating that overlap the modules longitudinally within the aircraft.

Embodiments will now be described by way of example with reference to the accompanying drawings in which.

Figure 8:
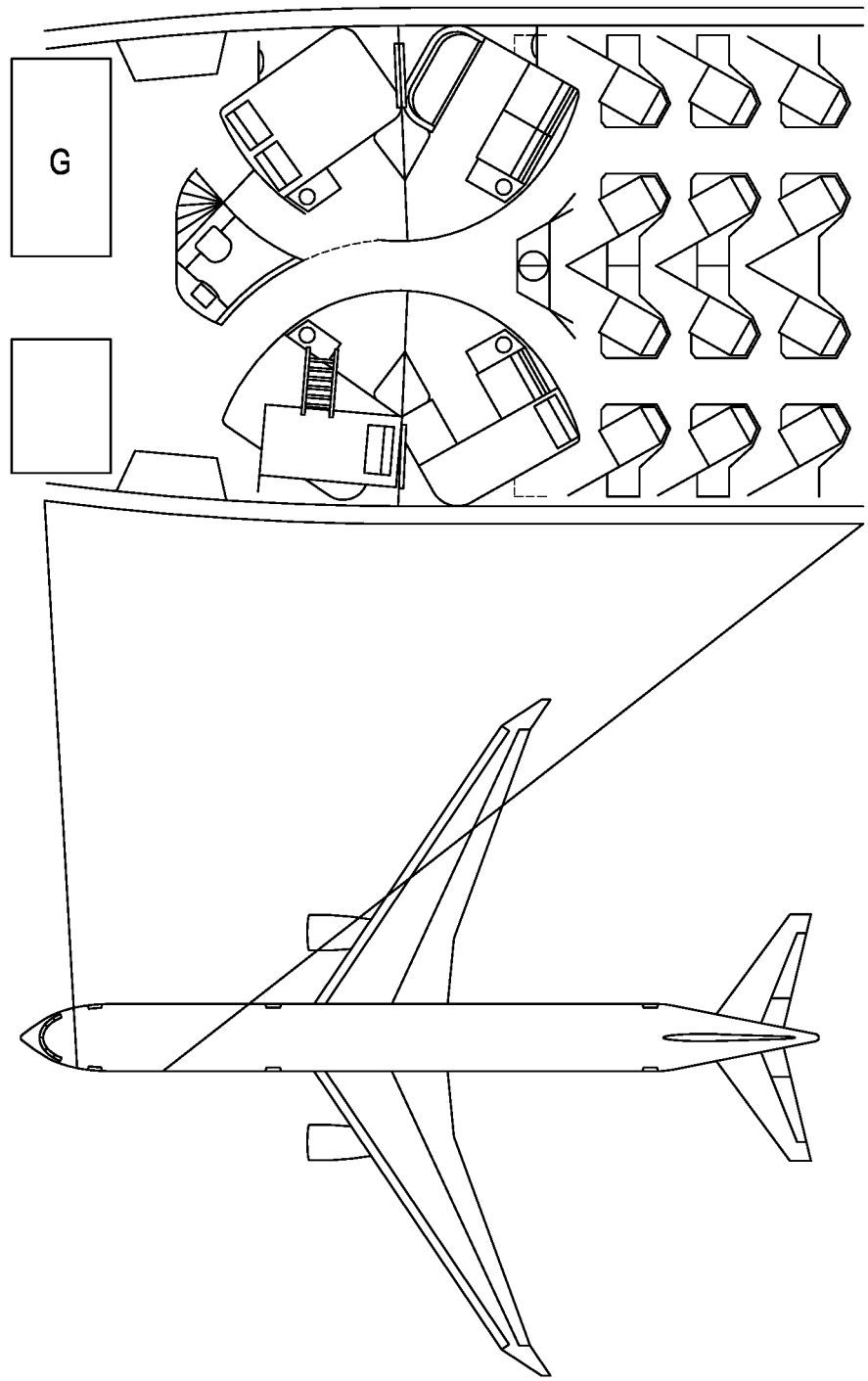

FIG. 7a), FIG. 7b), FIG. 7c), and FIG. 7d) are views of an internal arrangement of a cabin module according to disclosed embodiments; and FIG. 8 illustrates an aircraft and depicts the positioning of the relevant sections therein.

Figure 1:
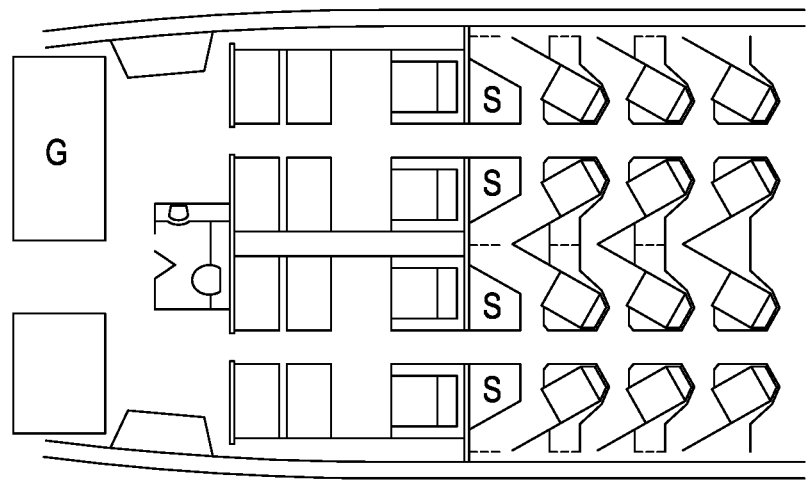
FIG. 1 is a plan view of a part of a prior art commercial aircraft accommodation space.
Figure 2:
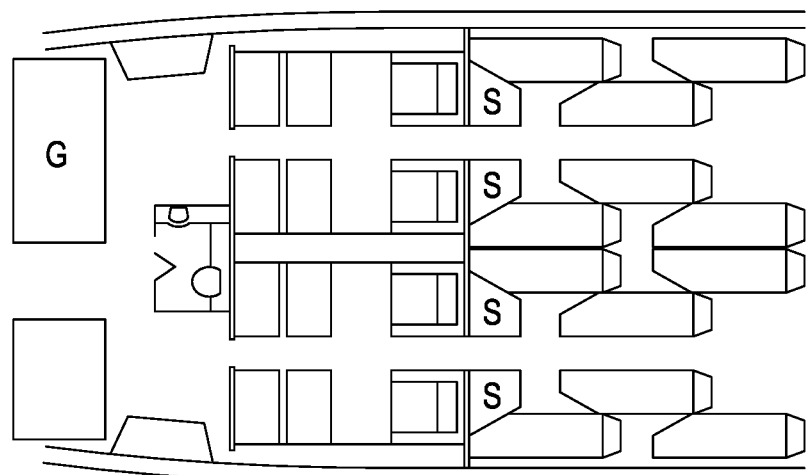
FIG. 2 is a plan view of alternative prior art commercial aircraft accommodation space.
Figure 3:
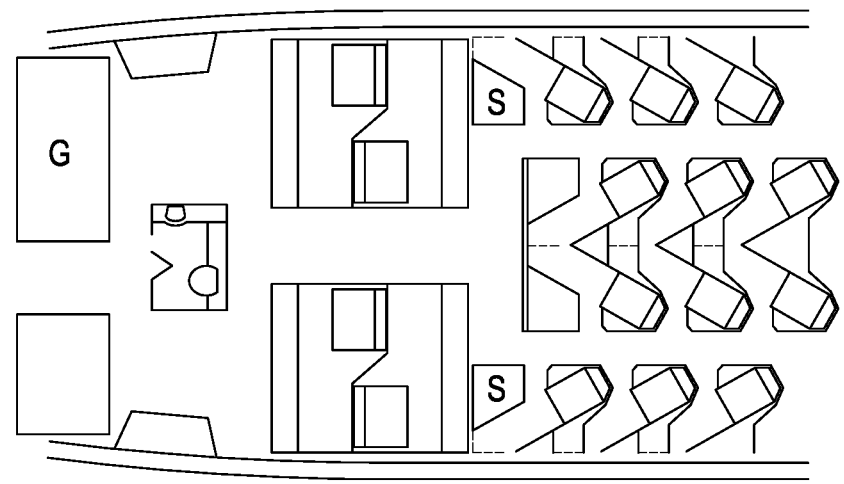
FIG. 3 is a plan view of a further alternative prior art commercial aircraft accommodation space.
Figure 4:
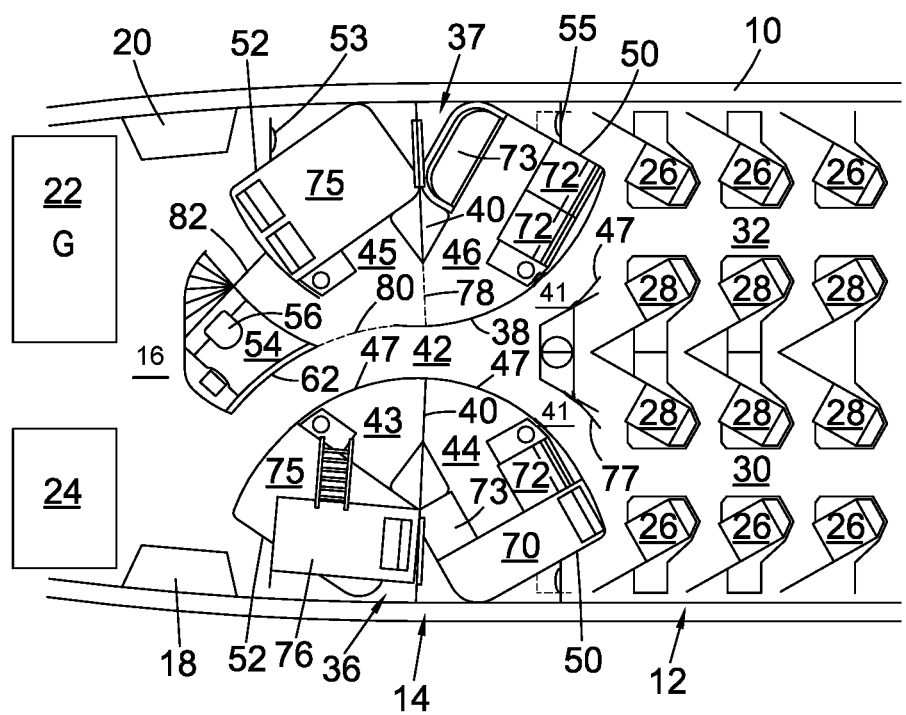
FIG. 4 is a plan view of a section of aircraft fuselage containing a first disclosed embodiment.

Referring to FIG. 4 of the drawings, a part of a fuselage 10 of a commercial passenger aircraft is shown. The part 10 includes an aft business class region 12 and a forward first class region 14. Forward of the first class region 14 is a vestibule area 16. The part of the aircraft depicted also has port and starboard passenger doors 18 and 20. Forward of the vestibule area 16 is a galley 22 and an enclosed utility space 24. Typically the space 24 is used as a washroom.

The business class region 12 is open and has seats installed in it in a known herringbone arrangement. The seats comprise individual outboard seats 26 and pairs of inboard seats 28. In known manner the outboard seats 26 are arranged facing generally forward but at an angle to the axis of fuselage 10 so that they longitudinally overlap, the foot well of an aft outboard seat 26 extending outboard and forward of the seat in front. Likewise, the inboard seats 28 are arranged at the same angle extending inboard and overlap as for the outboard seats 26. The gaps between the inboard seats 28 and their adjacent outboard seats define twin aisles 30/32 running generally in parallel with the axis of the fuselage 10.

Forward of the business class region, the first class region comprises a pair of cabin modules 36/37 each defined by floor-to-ceiling fixed bulkheads 38, which substantially enclose the module spaces, and a common central dividing bulkhead 40. The modules define quadrants arranged on either side of a single central aisle 42 which merges with the twin aisles 30/32 via transition regions 43. Each transition region 43 is defined between a central bulkhead 47 which houses the foot wells of the forwardmost inboard seats 28 on each side, and a part of the bulkheads 38. The bulkheads and other partitioning in the aircraft are made of typical weight efficient materials used in the aircraft industry and will be known to the skilled person in the art. As mentioned previously, the floor-to-ceiling nature of the bulkheads may be compromised by regulatory requirements in some circumstances. Thus, by "floor-to-ceiling" is meant bulkheads that substantially enclose the module space but which may include a gap or gaps. The purpose of the bulkhead is to create a sense of privacy whether it connects with the floor/ceiling or provides a gap for regulatory reasons.

The modules 36/37 of the first class region 14 extend aft into, and overlap with, the open business class region 12. Each module comprises pairs of cabins 43-46 on either side of the central aisle 42. The twin aisles 30/32 merge with the single central aisle 42 via the transitional aisle regions 41 which are respectively defined on an inboard side generally by a bulkhead 47 to the side of the foot well region of a front inboard one of the business class seats which extends diagonally and inwardly towards the central aisle 42. The outboard side of each of the transitional aisle regions 41 is defined by part of the bulkhead 38 of a respective rear cabin 44/46. The aisles essentially define a generally Y-shaped progression along the fuselage. The angle of approach from the two business class aisles to the central aisle in first class can be varied by adjusting the angle of the business class seats and the extent of the overlap. The essential requirement is that the stream of passengers progressing along the aisles is not inhibited significantly by a transition that is too abrupt. The Y-shaped transition is able to achieve this.

The cabin modules 36/37 are generally bounded by the floor-to-ceiling bulkheads 38 engaging the floor and shaped to the curvature of the fuselage which each define an arcuate quadrant in plan. The continuous arc may be executed as a sequence of flat bulkheads to similar effect. An aft end of each quadrant terminates in a radially extending wall 50 which overlaps an inboard side of a foot well 55 of the forward outboard business class seats 26 in the business class area 12. The forward edge of each quadrant terminates in a radially extending bulkhead 52 adjacent a forward passenger door 18/20 on each side of the fuselage 10. The radially extending bulkheads 50/52 have transversely extending bulkheads which mate each cabin module 44/46 with the fuselage 10 to enclose the spaces.

A central washroom area 54, having a toilet 56 is arranged forward of the central aisle 42. A bulkhead 62 of the area 54 continues the central aisle 42 to port along with the bulkhead 38 of the port cabin module 43. The area 54 can be incorporated within the module on the starboard side by reconfiguring the bulkhead 38 by deploying a bulkhead 80 and controlling access to the area via the galley by a door 82. For convenience in some embodiments the bulkhead may be replaced by a curtain. The central washroom area can be left out of the arrangement if its presence is deemed to be an obstacle in an emergency evacuation. Likewise, the inboard extent will be determined by the requirement for the single central aisle to have a width to cope with the merging of evacuating passengers from the two aisles aft.

Each first class cabin module 36/37 is sub-divided by the common internal bulkhead 40 creating the two private cabins in each module. The cabins 43-46 illustrate various arrangements of accommodation which each one can achieve by configuring the various pieces of furniture located within them. The fixed bulkheads are also formed with doors for accessing the cabins individually. The location of the door for each cabin of each module is a matter of choice based on safety and aesthetic considerations.

The common bulkhead 40, when fully deployed, creates two separate cabins of the module. By removing the bulkhead part 78, the floor space of the two cabin spaces becomes contiguous. The bulkhead 78 can be removed either by sliding it, removing it for storage elsewhere or otherwise causing a gap to be created between the remaining part of the common bulkhead 40 and the fixed bulkhead 38. With the part 78 of the bulkhead removed, the module is now usable as a suite in which a passenger, or passengers travelling together, can define one part for day use (for example) comprising seating and the other part for night use in which the side-by-side seats are deployed as a double bed.

The rear port cabin 44 illustrates a diagonally arranged outboard facing first seat 70 configured as a bed, and a parallel seat 72 arranged as a seat with an ottoman forward of it. There are various known ways to configure a lie-flat bed from an adjustable seat. In this embodiment the seat reclines and slides forward, and cooperates with the ottoman to create the sleeping surface. The seats are motorized in known manner to achieve the various reconfigurations. Other ways of configuring a seat into a bed will be well known to the skilled person.

In contrast the rear starboard cabin 46 has first and second seats 72 both configured as seats facing diagonally and forward. In the forward starboard cabin 45 the pair of seats are deployed as beds to create a double berth 75. The forward port cabin 43 is similarly arranged as the forward starboard cabin 45 except that a bulkhead mounted bunk bed 76 is shown deployed above the double berth 75. This is described in more detail below.

Not only are the seats reconfigurable, but the cabins defined within the modules are also configurable by use of removable bulkheads. The starboard module 37 is shown as a suite with a bedroom and a day room. This is achieved by removing an inboard part 78 of the laterally extending common inner bulkhead 40 so that the module defines a single intercommunicating suite within the module. Thus, the forward cabin is configured as the bedroom with the double berth 75 while the aft cabin is configured as the day room with seats 72. In the alternative, the forward cabin can be the day room and the aft cabin, the bedroom. The arrangements are up to the passenger to choose. In the port module 36 the bulkhead 40 is fully deployed to create two separate spaces in which the separate cabins are arranged according to the respective users' needs. Additionally, the forward starboard cabin can be combined with toilet area 54 by addition of removable bulkheads/curtains 80 and 82. In this way the occupier of the starboard module can be afforded a complete set of amenities in complete privacy. The deployed removable bulkheads/curtains 80/82 emphasize the route from the central aisle 42 to the port hand passenger door 18. Due to the guidance provided by the single curved aisle none of the passengers gaining access through the customary port hand passenger door now has to pass through the galley in order to gain access to their seats.

Figure 5:
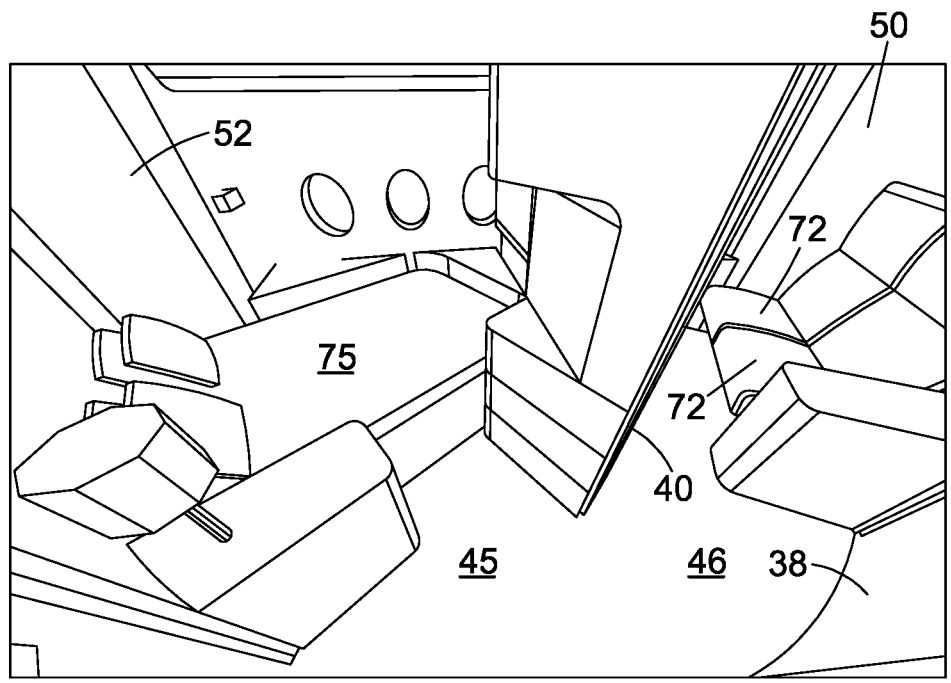
FIG. 5 is a perspective view of part of the section of FIG. 4.

It will be appreciated that the modules provide enclosed spaces using at least substantially floor-to-ceiling fixed bulkheads and a movable bulkhead 78 that can be removed to create a single enclosed suite. This is illustrated in the perspective view of FIG. 5 which depicts the starboard module of FIG. 4 by way of example. The seats in each cabin are arranged in side-by-side pairs facing outboard from the curved surface of the fixed bulkheads generally in parallel with the radially extending bulkhead. The two cabins are, in effect, mirror images of one another with the seats located away from the central common bulkhead to create free space in the middle of the module.

Various significant advantages accrue from the arrangement of the module with configurable cabins disclosed above. First, the cabins can be deployed as separate units on each side for separate fare paying passengers. However, they can be deployed together as a suite by removal of the separating bulkhead, thereby affording unfettered access to both spaces for the users. The central aisle, enhanced by the route to port, provided between the portside module and the washroom 54, enables the passengers entering and exiting the plane by the port forward passenger door to avoid having to navigate past the galley area which would otherwise detract from the high end experience of entering the first/business class regions.

The merging of the twin aisles into a single central aisle makes a better use of space than the twin aisles alone as the aisles themselves take up fuselage width that is better used for cabin accommodation. The efficiency of the essentially Y-shape of the aisles is facilitated by the business class region being overlapped longitudinally by the first class region. The requirement for clear delineation between cabin classes has dictated the use of identifiable lateral divisions between seat regions avoiding any overlap. The Y-shaped aisle transition is also more compatible with air worthiness certification requirements. The typical hard dog leg (90°) transition between twin aisles and a single central aisle makes emergency evacuation more difficult due to the abruptness of the transition, requiring more space in the transition to compensate. In contrast, the smooth flow between the twin aisles and the single central aisle by virtue of the Y-shape arrangement reduces the risk of a bottleneck and enables passengers to disembark more easily without having to increase aisle width and thereby lose space for accommodation. The transition between the twin aisles and the single central aisles further assisted by the acuate shape of the aisle defined by the module bulkheads and the opposite surfaces of the central bulkheads 47 in the aisle transition regions 43. Without the overlap the same Y-shape transition can be achieved but at the expense of having to remove the business class region farther aft, thereby further wasting space.

The "mirror image" arrangement of the two cabins in each module quadrant enables the "walkaround" whereby the twin aisles in business class can merge with the single central aisle and then, forward of that, diverge again towards the port and starboard passenger doors. At each passenger door it is a requirement that there is the "assist space" to one side in which a crew member is stationed to assist with passenger evacuation during an emergency. The quadrant shape of each module affords such a space by being terminated in the radially extended forward linear walls. The quadrant affords space aft in a similar way which is usefully taken up by the forward foot well of the respective overlapping outboard business class seats. This overlapping nature of the first and business class regions is counterintuitive.

Figure 6:
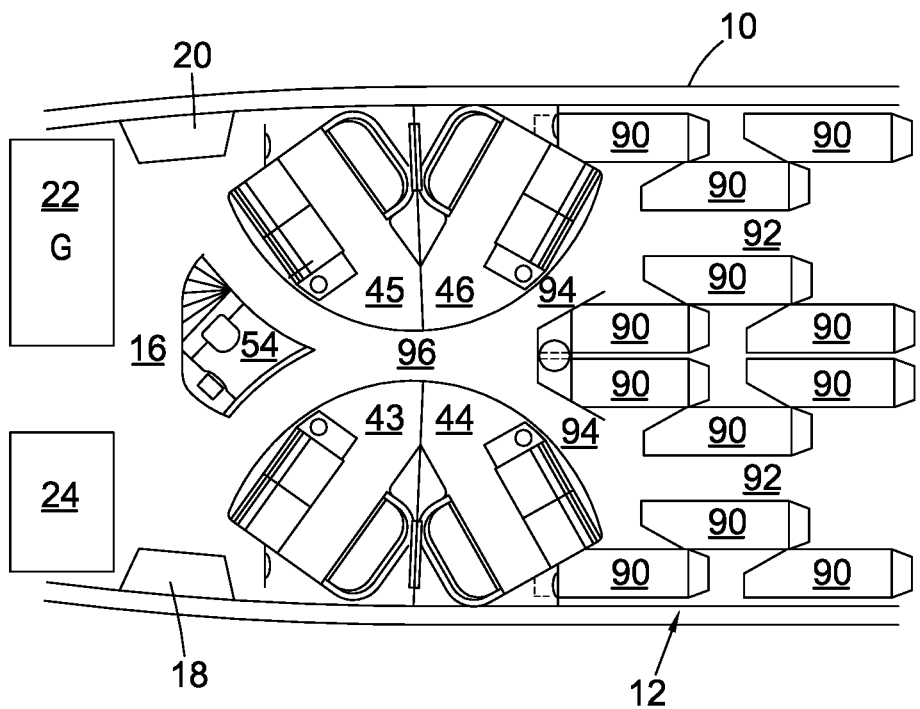
FIG. 6 is a plan view of a section of aircraft fuselage containing a second disclosed embodiment.

The overlapping quadrant type first class modules disclosed above in conjunction with herringbone business class seats are equally applicable to the alternative "fore and aft" staggered seating as shown in FIG. 6. Here the same numerals as used above are used to denote like parts. The business class seats 90 are arranged about twin aisles 92 as before. The seats all follow the axis of the fuselage. Outboard there are three seats alternately on the window and aisle sides. Inboard there are two lots of three seats in a similarly alternating inboard/outboard arrangement.

The forward outboard window seat 90 again utilizes the space between the quadrant and the fuselage by having its foot well extend into the otherwise void space so that the first and business class regions overlap. The forward inboard seat serves to define one side of the transitional aisle of the generally Y-shaped transitioning aisle 94 between the twin aisles 92 of business class and the single central aisle 96 of first class.

Referring to FIG. 7a), FIG. 7b), FIG. 7c), and FIG. 7d) there is illustrated the deployable bunk bed arrangement depicted in FIG. 4. The bed 100 is hinged parallel to the fuselage and is lowered and secured in place when needed above the double seat/bed arrangement in the cabin. A ladder 102 is folded over the bed which is unfolded to be deployed when the bed is lowered for use. This, in conjunction with the module being utilizable as a single suite, can create a module for the exclusive use of a family that is flying together.

FIG. 8 illustrates a position of the section of fuselage shown in FIG. 4 in an aircraft.

The invention claimed is:

1. An aircraft cabin assembly for an aircraft fuselage, the aircraft cabin assembly comprising:
   a pair of cabin modules, each cabin module defined by substantially floor-to-ceiling bulkheads;
   an arrangement of seats in an open seat region;
   the cabin modules extending longitudinally within the seat region occupied by the seats, each of the pair of cabin modules being configured for being arranged on either side of the fuselage to define a central aisle extending longitudinally between the pair of cabin modules;
   the seats in the seat region defining a pair of longitudinally extending side aisles between the seats; and
   diagonally extending transition aisles, which are respectively defined by a part of the respective bulkheads and by a bulkhead on an inboard side of the bulkheads, the transition aisles connecting each of the side aisles with the central aisle.

2. An assembly as claimed in claim 1 in which the modules are substantially symmetrical about a centerline.

* * * * *